United States Patent [19]
Ludt

[11] 3,820,014
[45] June 25, 1974

[54] CONDUCTIVITY MEASUREMENT SYSTEM
[75] Inventor: William C. Ludt, Yonkers, N.Y.
[73] Assignee: Ethyl Corporation, Richmond, Va.
[22] Filed: May 11, 1972
[21] Appl. No.: 252,474

[52] U.S. Cl. .................................. 324/30 R, 137/5
[51] Int. Cl. .......................................... G01n 27/42
[58] Field of Search .... 324/30 R, 30 B, 62 R, 65 R; 73/422 R, 61.1 R; 137/5

[56] References Cited
UNITED STATES PATENTS

| | | | |
|---|---|---|---|
| 2,654,067 | 9/1953 | Bruce | 324/61 R |
| 2,706,254 | 4/1955 | Mithoff et al. | 137/154 X |
| 2,878,831 | 3/1959 | Farnham et al. | 137/601 |
| 3,047,797 | 7/1962 | Borsboom | 324/30 |
| 3,282,113 | 11/1966 | Sachnik | 73/422 R |
| 3,306,320 | 2/1967 | Bono | 324/71 R X |
| 3,465,789 | 9/1969 | Suess | 137/604 |
| 3,578,421 | 5/1971 | Andress et al. | 44/62 |

FOREIGN PATENTS OR APPLICATIONS

| | | | |
|---|---|---|---|
| 73,216 | 7/1916 | Germany | 324/30 R |

Primary Examiner—Alfred E. Smith
Assistant Examiner—Rolf Hille
Attorney, Agent, or Firm—Donald L. Johnson; Robert A. Linn; Joseph P. Odenweller

[57] ABSTRACT

Disclosed herein is a system for measuring the electrical conductance of distillate hydrocarbon fuels during pipeline transport, comprising means for capturing a sample of the fuel from the pipeline in a test cell. The cell contains parallel guide vanes to minimize turbulence and a conductance probe comprising two high surface elements in spaced relationship. A potential is applied across the two elements and the signal generated by current flowing between them through the distillate fuel is amplified and measured on an ammeter calibrated in suitable conductance units. Also disclosed is an automatic programmer which continuously repeats the capture, measure and release signal, and a recorder which records the conductance values as a function of time. The system also includes an alarm to signal dangerously low conductivity and an automatic in-line blending device to add antistatic additive to the fuel in response to low conductivity readings.

4 Claims, 1 Drawing Figure

CONDUCTIVITY MEASUREMENT SYSTEM

BACKGROUND

Distillate fuels such as naphtha, diesel fuel, fuel oil, and the like, tend to build a static charge when flowing through a pipe such as in transfer operations or in long-range transport. The extent of the charge depends on the conductivity of the fuel. High conductivity fuels readily dissipate the charge; low conductivity fuels tend to accumulate the static charge, leading to potentially hazardous conditions. These are most acute when the fuel is being discharged into a tank.

SUMMARY

The present invention provides a system for continuously monitoring the conductivity of liquid hydrocarbon distillate fuels during transport in a pipeline whether between two close locations such as from one tank to another or over long distances such as in distribution pipelines. The system provides a means for removing a quantity of distillate fuel from a pipeline and isolating it in a test cell. The cell includes parallel guide vanes which serve to reduce turbulence of fuel entering the cell and hasten quiescence.

Located in the cell is a conductivity probe comprising two juxtaposed high surface electrical conductive elements which are separated such that fuel entering the cell fills the space between the elements. Means are provided to apply a potential across the two elements to induce a small current flow proportionate to the conductivity of the fuel. The signal provided by the current flow is amplified and measured on an ammeter calibrated to read the conductance of the fuel in appropriate units.

Optionally the system includes means to return the isolated or captured fuel to the pipeline and repeat the operation. A programmer is provided to automate the sequence and a recorder to record the conductivity as a function of time. An alarm is provided to signal potentially hazardous conditions when the conductivity drops below a predetermined safe limit. Optionally, means are provided, on signal from the conductivity value, to blend into the fuel at a location upstream from the system an antistatic additive which serves to increase the conductivity of the fuel to a safe level.

DESCRIPTION OF THE PREFERRED EMBODIMENTS

Figure 1:
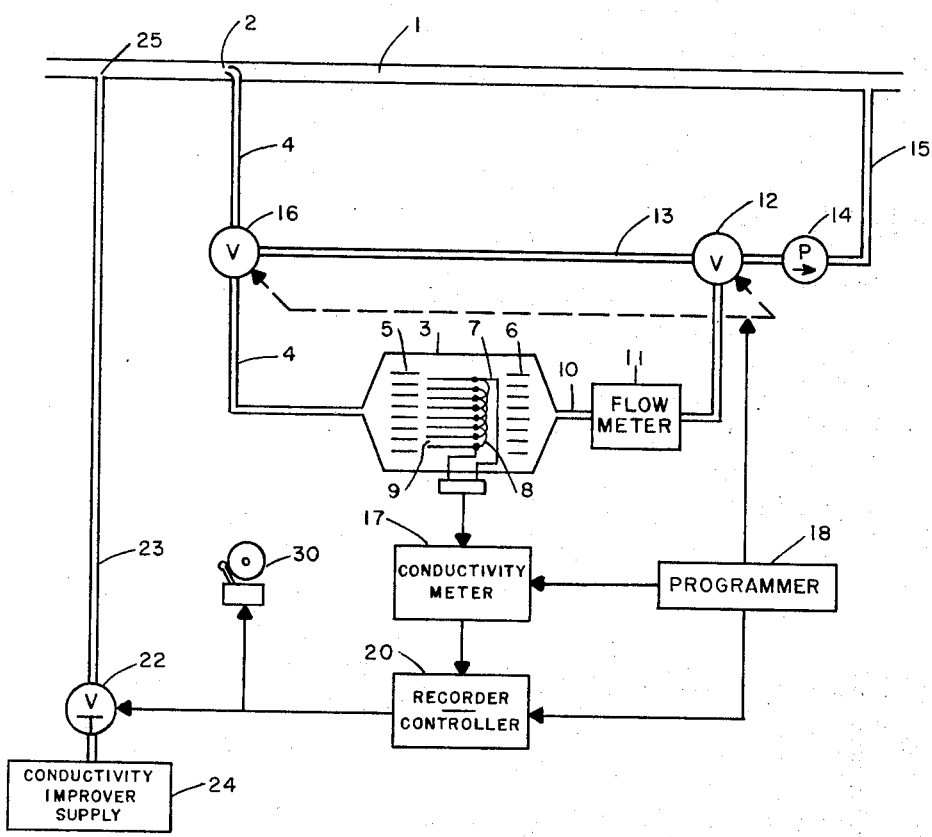
FIG. 1 is a schematic of the system connected to a pipeline.

Referring to FIG. 1, the system includes a pipeline 1 suitable for transporting distillate fuel. Sampling tube 2 extends into pipeline 1 and connects through conduit 4 and 3-way valve 16 to the inlet of cell 3. Cell 3 is a cylindrical housing having an inside diameter several times as great as conduit 4. It has an inlet at one end and an outlet at the other end. Located within cell 3 are two sets of parallel guide vanes 5 and 6. Located in cell 3 between guide vanes 5 and 6 are two sets of electrically conductive high surface metal elements 7 and 8 in juxtaposition but not in electrical contact. The working area of each set of elements ranges from about 30 to 45 square inches. A space 9 is provided between elements 7 and 8. Space 9 ranges from about 0.03 to 0.07 inch. The outlet of cell 3 is connected through conduit 10 and flow meter 11 to 3-way valve 12. A bypass conduit 13 connects valve 16 to valve 12 and forms a bypass path around cell 3. Valves 12 and 16 are interlocked and can be set to form a flow path through either cell 3 or bypass 13 to the inlet of pump 14. The discharge of pump 14 connects through conduit 15 back into pipeline 1 at a location downstream from sampling tube 2.

Conductivity meter 17 is electrically connected to elements 7 and 8 through suitable insulated bushings. Meter 17 includes a battery which applies a potential across elements 7 and 8 and a field effect transistor input operational amplifier having a pico-amp offset current which amplifies the signal produced by current flow resulting from the applied voltage. The amplified signal is read on an ammeter in terms of conductivity. A suitable conductivity meter is described more fully in application Ser. No. 252,473, filed of even date with this application by William C. Ludt and Eugene H. Lombardi, which is incorporated herein by reference.

Interval programmer 18 is electrically connected to conductivity meter 17 and to 3-way valves 12 and 16. Meter 17 is electrically connected to recorder 20 and to solenoid-operated throttle valve 22 located in conduit 23. Conduit 23 forms a path through valve 22 from antistatic additive reservoir 24 to orifice 25 located within pipeline 1 at a location upstream from sampling tube 2.

In operation, a portion of distillate fuel flowing in pipeline 1 enters sampling tube 2 and passes through valve 16 and conduit 4 into cell 3. The fuel continues out through conduit 10 and flow meter 11 through valve 12, pump 14, and conduit 15 back into pipeline 1. Fuel flow is adjusted such that the fuel flow within cell 3 is substantially laminar. Laminar flow within cell 3 is also encouraged by parallel guide vanes 5 and 6. The rate of flow through cell 3 can be observed at flow meter 11. After an interval of time to sufficiently purge cell 3, programmer 18 signals valves 12 and 16 to close the flow path through cell 3 and open the flow path through bypass 13, thus capturing a sample of distillate fuel in cell 3. After a short period of time sufficient for the fuel in cell 3 to become quiescent, programmer 18 signals conductivity meter 17 to turn on an read the conductivity of the distillate fuel between elements 7 and 8. This read interval is only a few seconds during the cycle. This reading may be observed visually on meter 17 which is calibrated in terms of picomhos per meter. At the same time, programmer 18 activates recorder 20 starting its chart drive motor. Meter 17 is also connected to recorder 20 which graphically plots the conductivity value during the read interval versus lapsed time. When the conductivity value being detected by meter 17 falls below a predetermined safe minimum, meter 17 through recorder-controller 20 signals throttle valve 22 to open and discharge at a metered rate a quantity of a hydrocarbon-soluble antistatic additive through orifice 25 sufficient to increase conductivity to a safe region.

After the conductivity reading has been recorded, programmer 18 turns off meter 17 and the chart drive motor in recorder 20 and then signals valves 12 and 16 to switch positions and close bypass conduit 13 and open the flow path through cell 3. Flow continues through cell 3 for an interval adequate to purge cell 3 of the previous residual fuel. At this time, programmer 18 signals valves 12 and 16 to again switch positions, opening bypass 13 and capturing a second distillate fuel sample in cell 3. The foregoing sequence repeats itself on this new sample.

In an optional arrangement, alarm 30 is connected to conductivity meter 17 and sounds an alarm whenever meter 17 reads a conductivity value below a predetermined safe limit.

The system as described operates on a capture—measure—purge cycle. The system can be operated on a continuous basis by having valves 12 and 16 close bypass 13 and open the flow path through cell 3. Conductivity meter 17 can then operate continuously or periodically, measuring the conductivity of the fuel flowing through cell 3. Such dynamic conductance will not be the same as static conductance and a different safe limit will be required.

Another embodiment of the invention is the use of fuel conductivity in the detection of the interface between two hydrocarbon fuels during pipeline transport. When liquid hydrocarbons are transported in pipelines it is common practice to follow one type hydrocarbon with a different type. It becomes necessary to accurately detect the arrival of the interface between these two hydrocarbons at the destination point so that they may again be segregated. According to this embodiment of the invention, the conductivity of the hydrocarbon is monitored and the arrival of the interface detected by a shift in conductivity. For example, a distributor desires to transport 100,000 bbls. of Gasoline A and 100,000 bbls. of Gasoline B to a storage tank located 800 miles away. Fuel A is a high aromatic nonleaded fuel analyzing:

| | |
|---|---|
| aromatics | 47% |
| saturates | 52% |
| olefins | 1% |
| sulfur | 0.05% |
| octane (clear) | 91 R.O.N. |

Fuel B is a low aromatic fuel containing tetraethyllead and analyzing:

| | |
|---|---|
| aromatics | 21% |
| saturates | 75% |
| olefins | 4% |
| sulfur | 0.01% |
| lead (as tetraethyllead) | 2.1 grams per gallon |
| octane | 94 R.O.N. |

It is required that fuels A and B be segregated in separate storage tanks at the destination point. The distributor has available a single 12-inch pipeline leading to the remote tank field. There is connected to the pipeline at the remote tank field an "on-line" conductivity measurement system as described herein. Fuel A is first pumped into the pipeline followed by fuel B. The estimated time of arrival (ETA) at the tank field is calculated. Several hours before the ETA the "on-line" conductivity measuring system is activated. Fuel A has a different level of conductivity than fuel B. Meter 17 is set to sound alarm 30 at the time a significant change in conductivity occurs. At this time, the fuel flow is diverted from one storage tank to another, resulting in segregated storage of fuels A and B.

In an improvement on this method, a conductivity changing additive commonly called an "antistatic additive" is placed in the pipeline at the distribution point immediately after fuel A has been pumped in. Suitable antistatic additives are described in U.S. Pat. No. 3,578,421; U.S. Pat. No. 3,455,665; and U.S. Pat. No. 3,449,097. An effective additive is commercially available from Ethyl Corporation under the designation "DCA 48". The amount should be adequate to provide a measurable conductivity surge when it arrives at the remote destination point. Immediately following this, fuel B is pumped into the pipeline. At a time just prior to the ETA of the interface, the "on-line" conductivity measuring device is activated and meter 17 set to sound alarm 30 at the time of a sharp increase in conductivity. This allows very accurate detection of the interface and clean separation of the two fuels.

I claim:

1. An on-line conductivity measurement system especially adapted for measuring the conductivity of distillate fuel during pipeline transport, said system comprising A. a test cell comprising a closed housing having an inlet at one end and an outlet at the opposite end, and including fixed parallel guide vanes in said cell aligned in the direction of flow through said cell which serve to reduce turbulence,
   B. a conductivity probe within said cell, said probe comprising two electrically conductive elements in juxtaposition but not in electrical contact with each other,
   C. means for conducting distillate fuel from said pipeline into said inlet,
   D. means for conducting distillate fuel from said cell outlet back into said pipeline,
   E. means for stopping the flow of said distillate fuel thereby isolating a quiescent sample in said test cell, and
   F. conductivity measurement means operatively connected to said elements, said measurement means comprising means for applying a voltage across said two conductive elements whereby electric current flows in proportion to the conductance of the material between said two conductive elements, means for amplifying said electric current and means for measuring said amplified electric current.

2. The system of claim 1 including a continuous interval programmer and recorder functioning during repeating cycles to signal the sequence of:

first — set said valve means to direct distillate fuel flow through said cell;
   second — set said valve means to direct fuel flow through said bypass, allowing fuel in said cell to come to rest;
   third — signal said conductivity measurement means to measure conductivity; and
   fourth — record conductivity on said recorder.

3. The system of claim 2 including alarm means actuated by said conductivity measuring means whenever the conductivity reading drops below a predetermined level.

4. The system of claim 2 including antistatic agent addition means adapted to meter antistatic agent into said pipeline whenever said conductivity measurement means detects a conductivity reading below a predetermined level.

* * * * *